United States Patent
Holloway et al.

(10) Patent No.: US 10,139,425 B1
(45) Date of Patent: Nov. 27, 2018

(54) SYSTEM AND METHOD FOR COLLECTING AND DISPLAYING WIND INFORMATION

(71) Applicant: TerraStride Incorporated, Columbia, SC (US)

(72) Inventors: C. Lanford Holloway, Columbia, SC (US); James P. Cleveland, Columbia, SC (US); Christian Blake Baxley, Columbia, SC (US); Marianna Simina, Columbia, SC (US); Sanjeev Kumar Singh, Kulti (IN)

(73) Assignee: TERRASTRIDE INCORPORATED, Columbia, SC (US)

( * ) Notice: Subject to any disclaimer, the term of this patent is extended or adjusted under 35 U.S.C. 154(b) by 563 days.

(21) Appl. No.: 14/730,737

(22) Filed: Jun. 4, 2015

Related U.S. Application Data

(60) Provisional application No. 62/008,968, filed on Jun. 6, 2014, provisional application No. 62/028,062, filed on Jul. 23, 2014.

(51) Int. Cl.
*G01P 5/00* (2006.01)
*G01P 13/02* (2006.01)
*G01W 1/00* (2006.01)

(52) U.S. Cl.
CPC ............... *G01P 5/00* (2013.01); *G01P 13/02* (2013.01); *G01W 1/00* (2013.01)

(58) Field of Classification Search
CPC ........... G01P 5/00; G01P 13/02; G01W 1/00; G01W 1/02; G01W 1/10; G01W 2201/00; G01W 2203/00
USPC ........ 702/2, 3, 19, 22, 51; 340/905; 701/439
See application file for complete search history.

(56) References Cited

U.S. PATENT DOCUMENTS

| | | | | |
|---|---|---|---|---|
| 8,902,081 | B2* | 12/2014 | Groeneweg | G08G 1/096775 340/905 |
| 2008/0180282 | A1* | 7/2008 | Brosius | G01C 21/00 340/995.27 |
| 2012/0310530 | A1* | 12/2012 | Lee | G01C 21/20 701/439 |
| 2016/0343093 | A1* | 11/2016 | Riland | G06Q 10/04 |

OTHER PUBLICATIONS

Antler Insanity, LLC Mobile App Screenshot, 1 page; available at least by Jun. 2, 2014; Publisher/author—Antler Insanity, LLC; Published on Apple App Store.

(Continued)

*Primary Examiner* — Toan Le

(74) *Attorney, Agent, or Firm* — Stephen H. Hall; Bradley Arant Boult Cummings LLP

(57) ABSTRACT

The present disclosure provides a method and system for graphically displaying wind information comprising: receiving weather information comprising wind information from a weather information source, wherein said wind information comprises wind speed and wind direction: displaying the wind speed and wind direction over a user selected geographic region on a handheld device display wherein the wind speed and wind direction are represented on the display by one or more concentric circles; and displaying the changes in the wind speed and direction over the user selected geographic region over a time period, wherein the changes in the future wind speed and direction are depicted on the display changing the appearance of one of more of the concentric circles.

22 Claims, 10 Drawing Sheets

(56) References Cited

OTHER PUBLICATIONS

AccuWeather.com Wind Direction Screenshot, 1 page; available at least by Jun. 2, 2014; Publisher/author—AccuWeather, Inc.; Published at www.accuweather.com.

Huntlogix ScoutLook Website Screenshot, Sep. 24, 2011, 2 pages; believed available at least as of Sep. 24, 2011; Publisher/author—Huntlogix, LLC; Published at www.scoutlookweather.com.

Huntlogix ScoutLook Mobile App Screenshot, 1 page; available at least by May 30, 2014; Publisher/author—Huntlogix, LLC; Published on Apple App Store.

\* cited by examiner

SYSTEM AND METHOD FOR COLLECTING AND DISPLAYING WIND INFORMATION

CROSS REFERENCE TO OTHER APPLICATIONS

This application claims priority to, and the benefit of, U.S. Provisional Patent Application Nos. (i) 62/008,968 titled "System and Method for Collecting and Displaying Wind Information" filed on Jun. 6, 2014 and (ii) 62/028,062 titled "System and Method for Collecting and Displaying Wind Information Using Co-Centric Circles" filed on Jul. 23, 2014.

FIELD OF THE DISCLOSURE

The present disclosure pertains to the field of wind information, and in some specific embodiments, more specifically pertains to analyzing and graphically displaying past, present and future wind information.

BACKGROUND

Hunters often need to understand both the directionality and speed of the wind as game animals such as deer have very sensitive noses that serve as the animal's primary method of detecting predators in their area. Hunters in the past have used a variety of methods of concealing their scent including scent cover ups and scent eliminating soaps; however, the most effective way for an outdoorsman to avoid detection is to approach a game animal from a downwind direction so that his scent is not carried to the game animal. Hunters have also employed a variety of wind measuring devices to aid them in determining both the directionality and speed of the wind. Smart phones and similar devices have become common tools used by hunters to determine the phases of the moon and other factors that can determine the movement of game animals and therefore the likelihood of success on a hunt. Given the prevalence of smart phones and similar devices (such as tablets) today, there exists a need for a system and method which allows hunters to use these devices to increase the likelihood of success on a hunt and such a system and method is disclosed herein.

BRIEF DESCRIPTION OF THE DRAWINGS

To further explain the advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

SUMMARY OF THE DISCLOSURE

Figure 1:
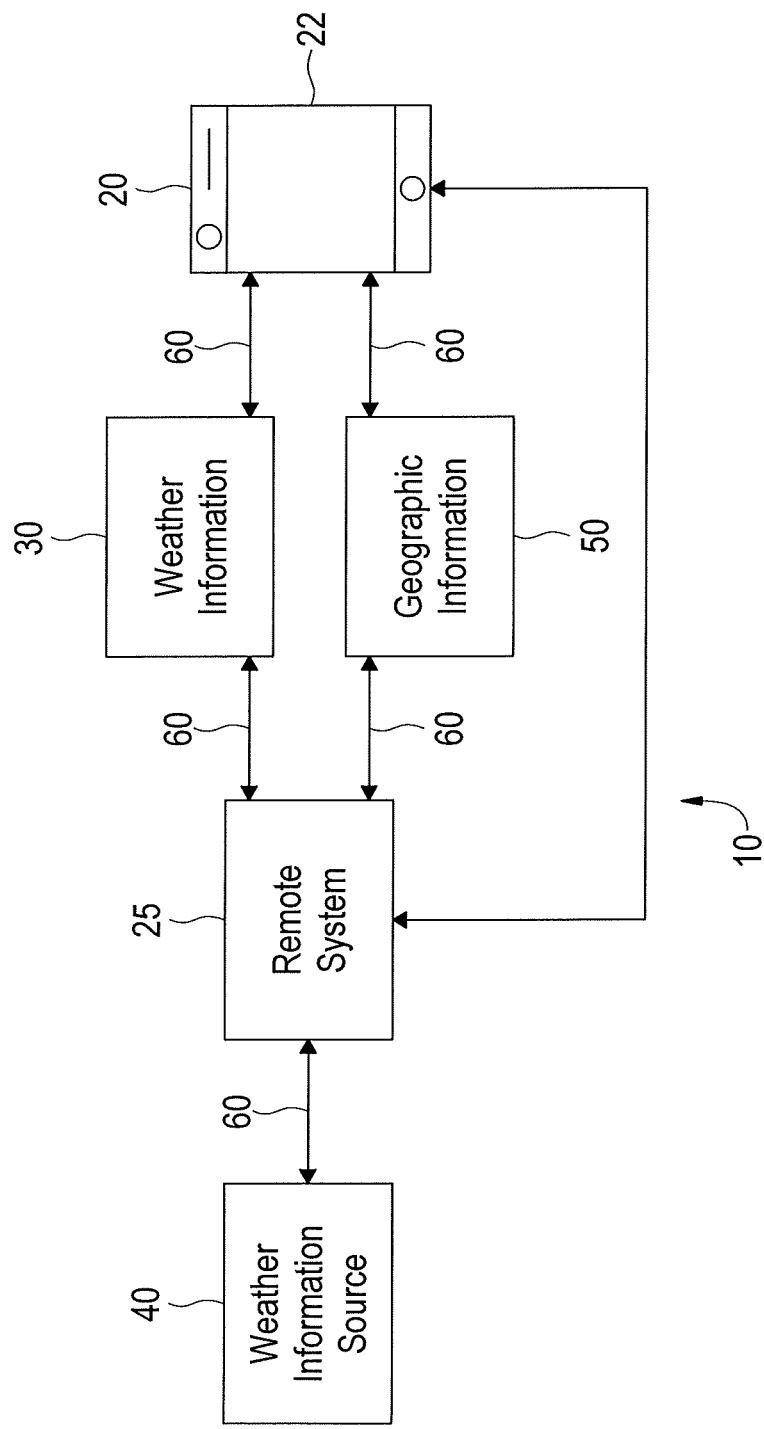
FIG. 1 shows one embodiment of the system disclosed herein.

It is one object of the present disclosure to provide a simple and user-friendly graphical wind information depiction. The depiction can display and depict wind direction using a circular display, although other configurations may also be used. The depiction can illustrate the instantaneous wind speed, direction, and time for any specific location, as well as wind and its effect over time. The interface can be supported by a downloaded or live weather forecast database, or other accessible databases. Furthermore, in one embodiment, part of the invention's graphical interface allows a user to view a high-level chart depicting the wind speed and direction for a particular location for a period of time into the future, or over some past time period. By selecting a specific segment of time on this high-level chart, that segment may be examined in greater detail. This system provides an efficient and clear graphical representation of wind speed, direction, and time relative to a specific location.

The present disclosure, in various embodiments, may have one or more of the following features:

A. A system on a handheld device with a visual display that is able to download detailed weather information including wind speed, direction, and time (along with many other variables) and saves that information in an organized manner so that it can be accessed and utilized at a later time.

B. A system on a handheld device with a visual display that is able to download detailed weather information including wind speed, direction, and time (along with many other variables) in real-time so that it can be utilized by the system in real time.

C. A system that uses the downloaded or live weather information to create a 360 degree representation (circle) of wind direction where the circle is a solid color with the exception of the changing portion or segment.

D. A system that uses the downloaded or live weather information to create a 360 degree representation (circle) of wind direction and has a different colored portion of the 360 degree representation that shifts to indicate the direction of the wind for a particular location.

E. A system that uses the downloaded or live weather information to create a 360 degree representation (circle) of wind direction and has a 2nd colored portion of the 360 degree representation that shifts to indicate the direction of the wind from a particular location as the user advances through time.

F. A system that uses the downloaded or live weather information to create a 360 degree representation (circle) of wind direction and has a 2nd colored portion of the 360 degree representation that shifts to indicate the direction of the wind from a particular location as the user advances through time. As time moves forward, a 3rd color indicates everywhere the shifting portion of the circle touches through the entire period of selected time.

G. A system utilizing a circular wind direction depiction in which the radius of the circle may be increased or decreased by the user.

H. A system utilizing a circular wind direction depiction in which the radius of the circle may be increased or decreased automatically to illustrate changes in wind speed.

I. A system utilizing a circular wind direction depiction in which the wind direction indicator may logically be inverted to satisfy various use-cases in which knowing the opposite direction of the prevailing wind may be useful.

J. In an alternate form, each changing segment of the circle may be a pie shaped segment/wedge (or another form) of different lengths.

K. In an alternate form, each changing segment of the circle may be a pie shaped segment/wedge (or another form) of different lengths where each length represents the wind speed at a particular time.

L. In an alternate form, the radius of the circle may change to indicate the wind speed.

M. In an alternate form, the wind direction depiction may be made up of "force vector" arrows that indicate the strength of the wind based on the length of the vector arrow.

N. In an alternate form, the wind direction depiction may be made up of "force vector" arrows that indicate the strength of the wind based on the width of the vector arrow.

O. In an alternate form, the high level wind chart may cover various periods of time.

P. In an alternate form, the high level wind chart may include two independently selectable points on the chart that the user may manipulate in order to select the Start and End times of the period of time that they wish to explore further.

DETAILED DESCRIPTION

The present disclosure provides a system 10 and method useful for hunters and other outdoorsmen to analyze, and visually and graphically display, historic, real time and future information concerning weather and geographic conditions.

As shown in FIG. 1, in some embodiments, the system 10 includes a handheld device 20 that is capable of receiving weather information 30 and geographic information 50 via a network connection 60. In a particular embodiment, the handheld device 20 is in communication with a remote system 25 which may be a central server or other remote computer. In such an embodiment, the remote system 25 may first receive the weather information 30 and geographical information 50, perform certain functions and calculations based upon the received weather information 30 and geographical information 50, determine how to graphically display said received information and then may communicate such information on to the handheld device 20. The handheld device 20 may also have geographical information 50 stored in memory.

The handheld device 20 may be a smart phone (such as an Apple® iPhone or a Samsung® phone), a tablet (such as an Apple® iPad® or Samsung® Galaxy), a modified GPS device (such as a Garmin® Oregon®) or a standalone device specifically designed to provide the functionality disclosed herein. Generally, the handheld device 20 includes a memory, a display 22, and network connectivity system (such as a transceiver to interact with a WiFi signal, as discussed below), processor, and installed firmware or software to implement the functionality discussed herein.

The handheld device 20 receives weather information 30 from a weather information source 40 via a network connection 60 (which could be directly from the weather information source 40 or via the remote system 25). The weather information 30 may include wind information 32 such as the direction 32a, speed 32b, time of day 32c and expected changes 32d to either the direction 32a or speed 32b of the wind over a period of time. Other details such as temperature, humidity, precipitation and cloud cover may also be preferably included within the weather information 30. The weather information source 40 may be a variety of sources such as the National Weather Service (NWS), The National Oceanic and Atmospheric Administration (NOAA) or private providers such as Baron Services, AccuWeather.com or WeatherUnderground.com. The weather information 30 provided by the weather information source 40 can be historical, real time or forecast in that the hunter may be provided information about past weather conditions (as discussed more below).

In some embodiments, the handheld device 20 receives geographic information 50 via the network connection 60. The geographic information 50 may include topological data, satellite imagery (such as is available from Google® Maps), roadways or trails, bodies of water (such as rivers, ponds, streams and lakes) and other information that would be useful to a hunter in planning a hunt. As discussed above, the geographical information 50 may be stored in memory, and not required to be received from a separate source.

The handheld device 20 receives the weather information 30 and the geographic information 50 via a network connection 60. This network connection 60 may be wireless such as a cellular signal or WiFi signal, or it may be wired such as a connection to a modem or Ethernet connection. In some embodiments, the handheld device 10 is a smartphone and the network connection 60 is a cellular signal. In these embodiments, the handheld device 10 may receive updates concerning the weather information 30 and/or the geographic information 50 in real time and thus provide the hunter with extremely useful information about their hunt. Additionally, as will be recognized by one of ordinary skill in the art, often times the best hunting areas are remote, so the handheld device 10 may not have, or be able to reliably access, a network connection 60 in the hunting area, so the handheld device 20 may receive or download the weather and geographic information 30, 50 ahead of a hunt (such as at a hunting camp or driving to the hunting area) and store the information in its memory for access and use later. In some embodiments, the handheld device 20 then displays, via the display 22, the weather and geographic information 30, 50 to the hunter in a graphical output as described below.

In one embodiment, the system 10 may also receive solunar information which is information concerning the sunrise/sunset, the phase of the moon and "hunting tables" indicative of when the best and most productive times to hunt are predicated for a certain day or period. Solunar information is available from a number of sources such as AccuWeather.com or WeatherUnderground.com.

In some embodiments, the remote system 25 receives the weather information 30, geographic information 50, and/or solunar information from the particular source, such as a weather information source 40. The remote system 25 then may store the received information in a database until an end user requests such information. The remote system 25 then may perform certain calculations and analysis of the received information necessary to provide the graphical weather information and display discussed below and then may transmit said information to the handheld device 20 for display to the end user. Such information can be automatically "pushed" to users, or it can be retrieved, or "pulled", by a user upon request, for example, a user logging into an account and/or requesting wind information.

Figure 2:
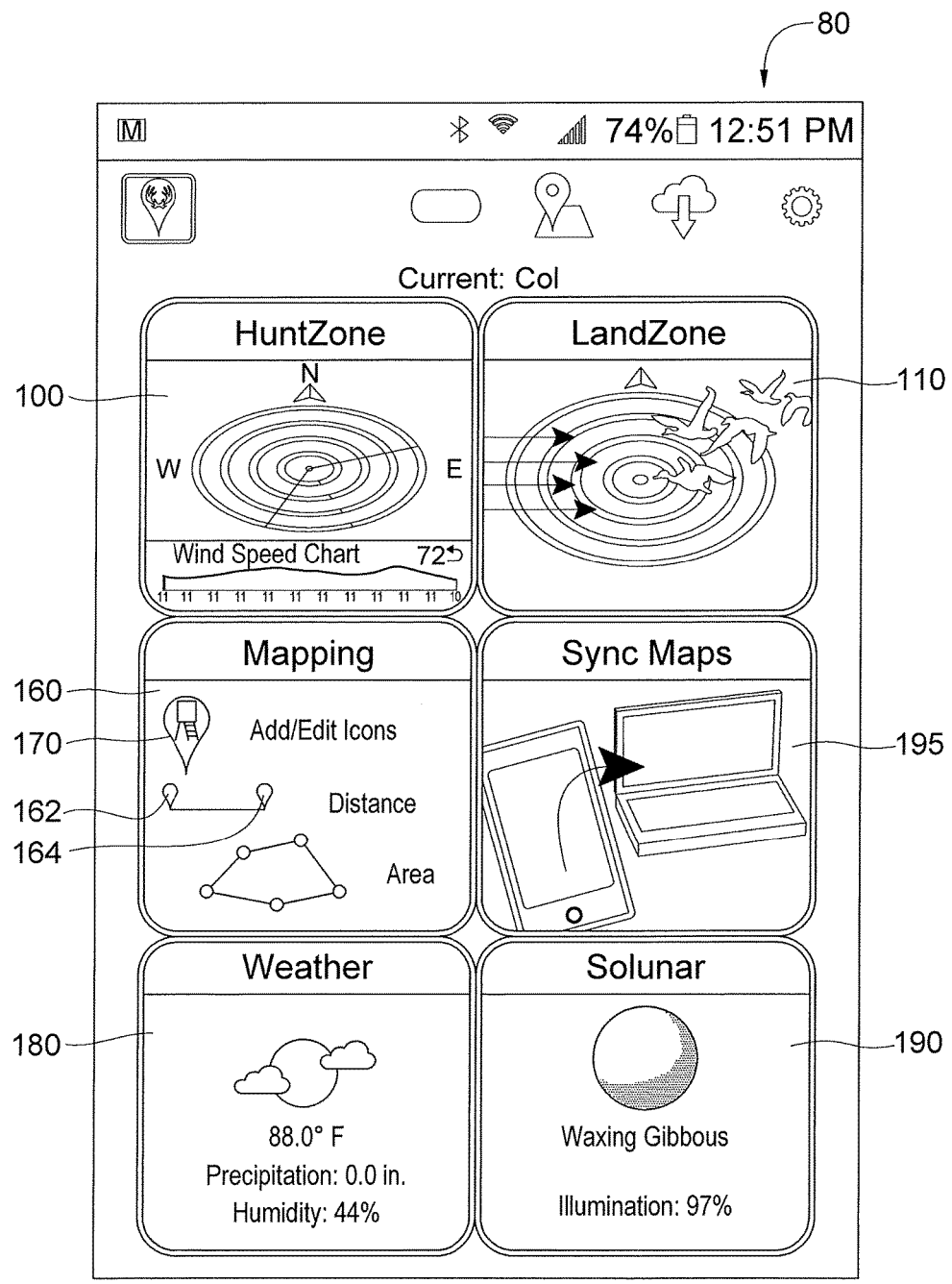
FIG. 2 shows one embodiment for a main control screen for the system and method disclosed herein.

In various embodiments, installed firmware or software functionality of the present invention is shown and is illustrated in FIGS. 2-10. FIG. 2 shows an embodiment of a main control screen 80 of one embodiment of the system 10 depicting several optional control features and functionality. The "HuntZone" tab 100 may be used to launch or access one embodiment of the present invention having the graphical weather information display (for examples, FIGS. 5-9). The "LandZone" 110 tab may be used to launch or access another embodiment of the present invention having the weather information 30 overlaid on geographic information 50 (for example, FIG. 10).

In some embodiments of functionality available under the LandZone tab 110 includes a graphical depiction of one or more arrows 120 representing the wind direction 32a (which may vary over time), and a graphical depiction of one more icons 140, for example, outlines of waterfowl 140a. Generally speaking, waterfowl will often fly into a potential landing zone into the wind. Thus, if the arrows 120 representing the wind direction were pointing east, the waterfowl icons 140a (in this example) would be placed to the right (or to the east) of the arrows 120.

The graphical display of LandZone tab 110 could be centered on the location of a duck blind or other hunting area (or other user defined geographic area), and would give the hunter a graphical representation of where a hunter should expect most waterfowl to approach the blind or hunting area.

FIG. 2 also shows a "measurement" or alternatively a "mapping" tab 160 which may be used to launch or access functionality giving hunters the ability to measure the distance between two points 162, 164 marked on a map by the hunter, to determine the area of a geographic boundary defined by the user, and/or "Add Icon" or "Add/Edit Icons" functionality 170, which may be used to launch or access functionality giving users the ability to add various icons to different locations. For example, a user may want to locate an icon representing a deer bedding area in an area where deer are known to bed, an icon representing a tree stand where the hunter has placed a tree stand, an icon representing a rub line where the user has seen a deer rub, etc. Other icons can be used for natural food sources, feeders, game cameras, camp, parking areas and game trails. This allows the user to quickly and easily visually see the various locations that may be of interest to the user on a map. The icons can have images associated with the particular location, i.e., an image of a bedded dear for bedding locations, an image of a tree stand for a tree stand location, etc.

FIG. 2 also shows a "Weather" tab 180, which may be used to launch or access functionality giving users access to current and forecasted weather information 30, for example, temperature, humidity, precipitation, cloud cover, wind speed 32a and direction 32b. FIG. 2 also shows a "Solunar" tab 190, which may be used to launch or access functionality giving users access to current and forecasted solunar information. The weather information 30 and solunar information can be accessed and/or downloaded from sources known to those of ordinary skill in the art, including the weather information sources 40 described above. The weather information 30 and solunar data, in one embodiment, can be stored in the memory of handheld device 20. As shown in FIG. 2, in one embodiment, a user can "click" a button on the display 22 to download (represented by a cloud with a down pointing arrow arrows) weather information 30 or they may select the "sync maps" tab 195. The "sync maps" tab normalizes maps that may have been created or altered on different devices or at different times. For example, a user may have created a map while logged onto the user's account on his/her desktop. When the user logs onto his/her mobile device, the user can sync his earlier created map for viewing and possible alternation while in the field. If additional changes are made by the user on a mobile device (for example, an icon is added), and the user later syncs maps when logged onto his/her desktop, those changes created on the mobile device will be updated for viewing on the desktop. Optionally, the hunter may be shown the time of the most recent download so that they can easily determine when the weather information 30 and/or solunar information was most recently downloaded.

Figure 3:
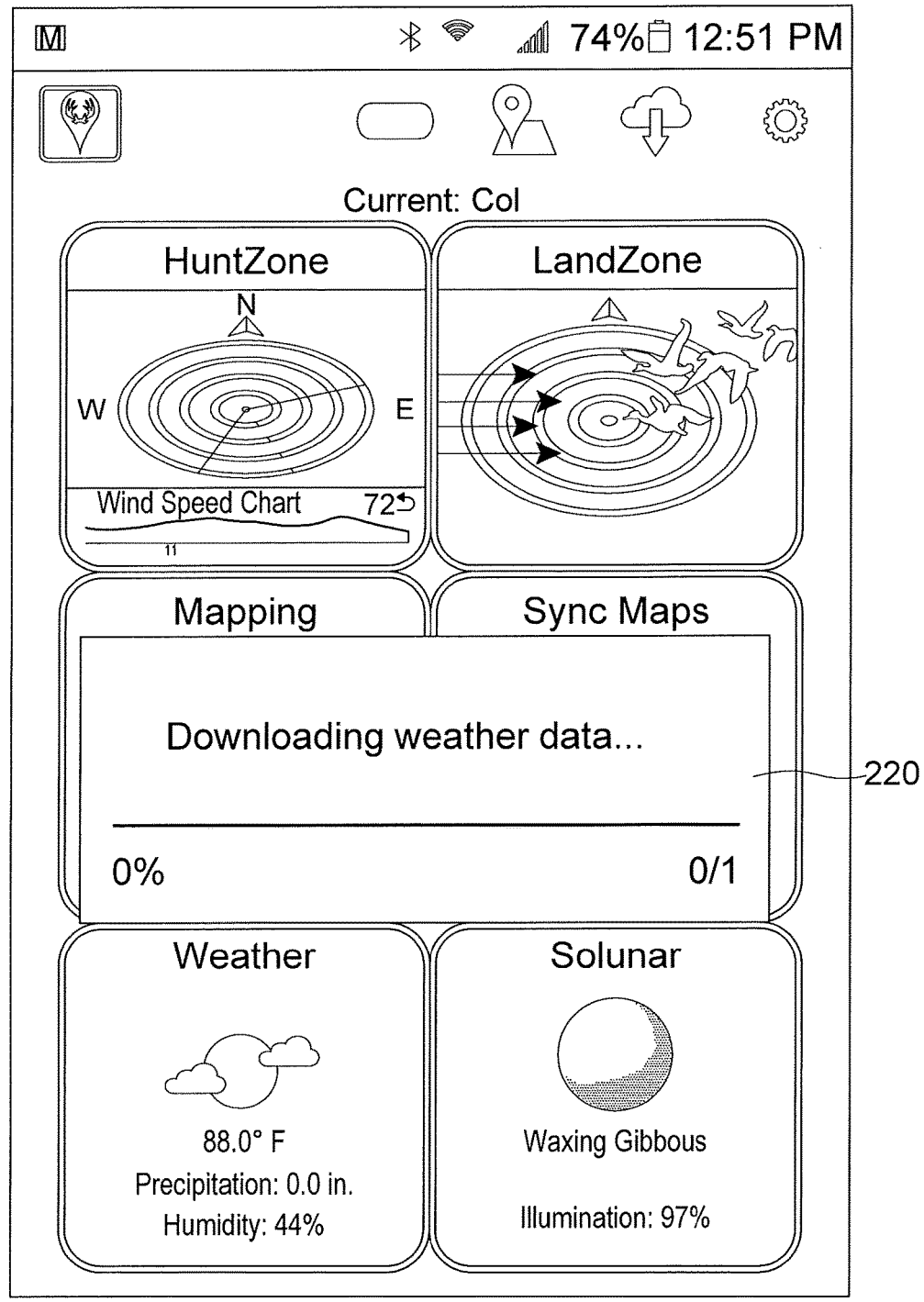
FIG. 3 shows one embodiment of the system and method disclosed herein downloading a detailed weather forecast so that it is accessible anywhere with or without an active data connection.

FIG. 3 shows one embodiment of the progress bar 220 illustrating the process of downloading the detailed weather information 30 to the handheld device 20.

Figure 4:
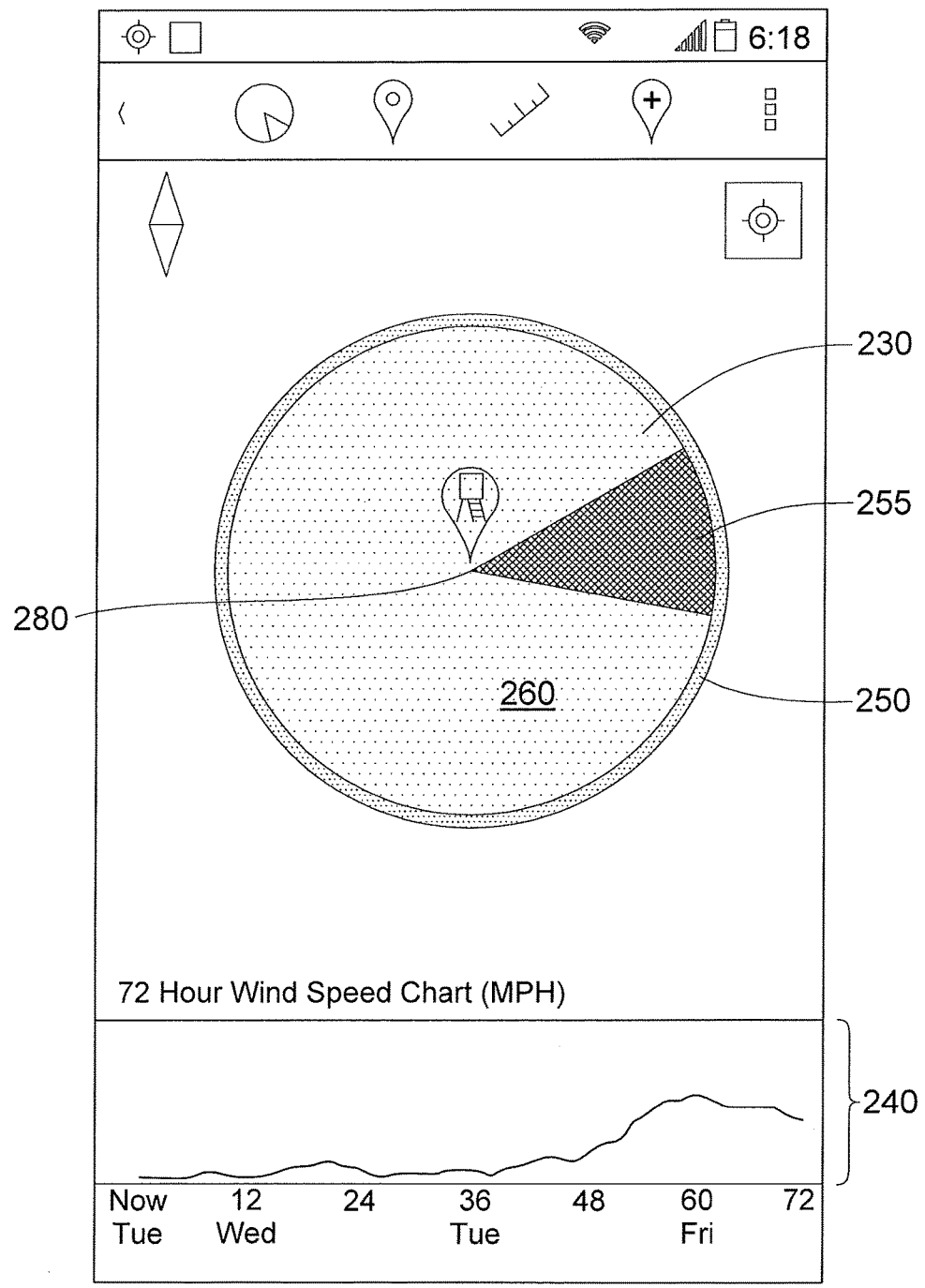
FIG. 4 shows one embodiment of the high level chart illustrating wind speed over time and the circular wind direction depiction disclosed by the system and method disclosed herein.
Figure 5:
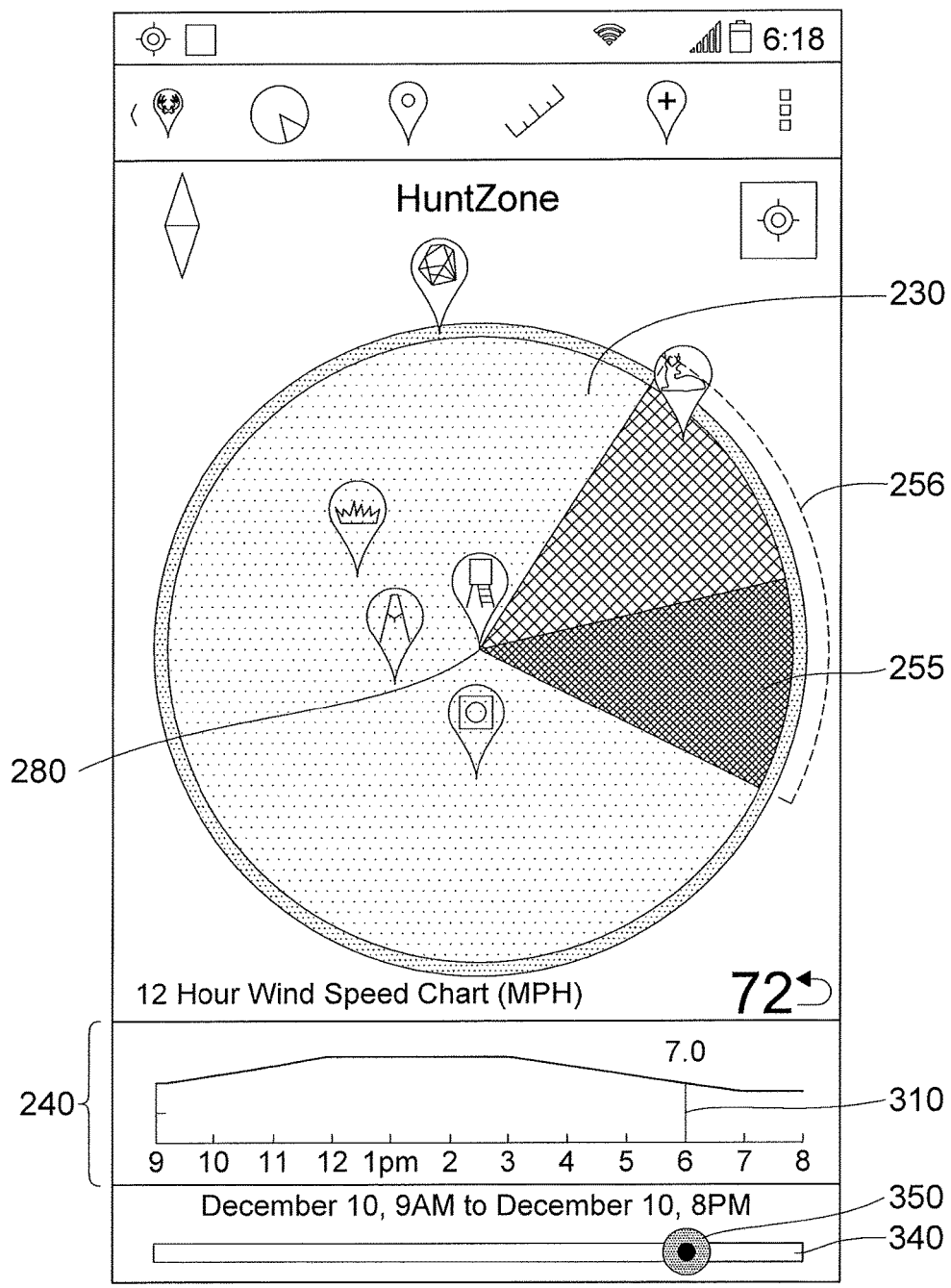
FIG. 5 shows one embodiment of a second and more detailed view of the wind speed chart as well as a way to interact with the chart to control the circular wind direction depiction.

As shown in FIG. 4, the weather information 30, including without limitation the wind information 32 may be depicted graphically by the system 10. In FIG. 4, the initial state of the circular wind direction depiction 230 as well as a high-level view of the wind speed chart 240 are shown. The outer boundary 250 of the circular wind direction depiction 230 may be of a contrasting color to aid the hunter in viewing the outer boundary 250 during low light times. Likewise, the interior 260 of circular wind direction depiction 230 may be of a contrasting color to aid in the viewing of the circular wind direction depiction 230. The coloring can be shaded so that the user may see the underlying satellite imagery. The high level future wind speed chart 240, in some embodiments, is a line graph of wind speed 32b for some future period of time. The high level future wind speed chart 240 may also serve as an interface through which to select a more specific period of time (an example of which is shown in the bottom of FIG. 5). The center 280 of the graphical wind direction depiction 230 can be designated to correspond to a particular location selected by hunter, for example a hunting stand location. The illustrations of the wind direction are preferably based off of this user-selected center 280. The center 280 may be moved at will by the hunter to various locations. The instantaneous wind direction (at the current time, or a future time selected by the user) of the wind relative to the center 280 may be shown, designated by the orange pie shape, or wedge 255 in FIG. 4. The high level future wind speed chart 240 may use standard touchscreen technology to allow a user to select a specific segment of time to examine in greater detail is also shown.

FIG. 4 shows one specific segment of time covered by the high level wind speed chart 240, and in this embodiment shows the anticipated winds over the next 3 days from the last download time, and can include dates and hours. Longer or shorter time periods can be used. This also aids users by giving them a point of reference when selecting a specific segment from the high level wind speed chart 240. In this embodiment, the high level wind speed chart 240 depicts the wind speed from the "current" time and through the next 72 hours. The user can select any specific time increment for more details.

FIG. 5 shows the second stage of the circular wind direction depiction 230 in the example shown in FIG. 4, as well as the more specific user-selected time segment selected as described above. In this embodiment, as the user moves forward through time on slide bar 340 at the bottom of the display 22 by sliding indicator dot 350 along slide bar 340, the selected time 310 is shown in the high level wind speed chart 240 (which, in this embodiment, is a shorter time period than shown in FIG. 4) and the instantaneous wind direction indicator 255 of the wind direction depiction 230 will move to illustrate the direction of wind relative to central point 280 at the selected time. The changes in color on the circular wind direction depiction 230 indicate the changes in the wind direction 32a. In FIG. 5, the instantaneous wind direction indicator 255 is shown in a bright orange, and most of the remainder is shaded in green. In one embodiment, shown in FIG. 5, the display can also show a "composite wind direction" 256, and represented in FIG. 5 by the lightly shaded orange color. The "composite wind direction" 256 is everywhere that instantaneous wind indicator has moved between the start of time segment 310 and the user selected specific time (6 pm in FIG. 5). In the example shown in FIG. 5, from 9 am until 6 pm, the composite wind direction 256 wedge is from about the 1 o'clock position to the 4 o'clock position. In this embodiment, the instantaneous wind direction indicator 255 is included within the "composite wind direction" 256, but since a darker shade of orange is used in this embodiment, it essentially overrides the lighter shade (obviously, users will recognize that the current wind direction is included within the composite wind direction 256). Furthermore, as the user slides indicator dot 350 along slide bar 340 the wind speed 32b at specific times is shown on the chart 240 above. For particular applications, for example in a hunting application, the instantaneous wind direction 255 can be used to estimate where a hunter's scent might be detectable by game based on a particular wind direction 32b and speed 32a at any given time. Moreover, where the wind is viewed over a period of time, the larger shaded section of the composite wind direction 256 can be used to estimate where a hunter's scent might be blown over a period of time.

While the functionality related to a user moving forward through time on slide bar 340, displaying the instantaneous wind direction indicator 255, composite wind direction 256, etc. is discussed above with respect to a user selected time period, this same functionality can be used with the default larger time periods shown in FIG. 4.

The size of the circle (e.g., radius) can also be adjusted to correspond to the speed of the wind, for example, a smaller circle for a 7 mph wind, and a larger circle for a 15 mph wind. More specifically, the radius of the circle for a 7 mph wind might be 300-500 yards while the radius of the circle for a 15 mph wind might be 500-1,000 yards. For example, a hunter's scent may be blown farther, and be detectable, in a strong wind than a light wind. The user can also select the radius of the circle. In this example shown in FIG. 5, the green shaded area represents an area where a hunter's scent is unlikely to be detected, a deep orange color where the hunter's scent is most likely detected at a particular time, and a lighter shade of orange showing the scent is most likely detectable over the selected time period (or at least up to the specific time "scrolled" through by the user). Distance measurements can also be added to specific portions of the display, e.g., the distance away from the center of the display.

Figure 6:
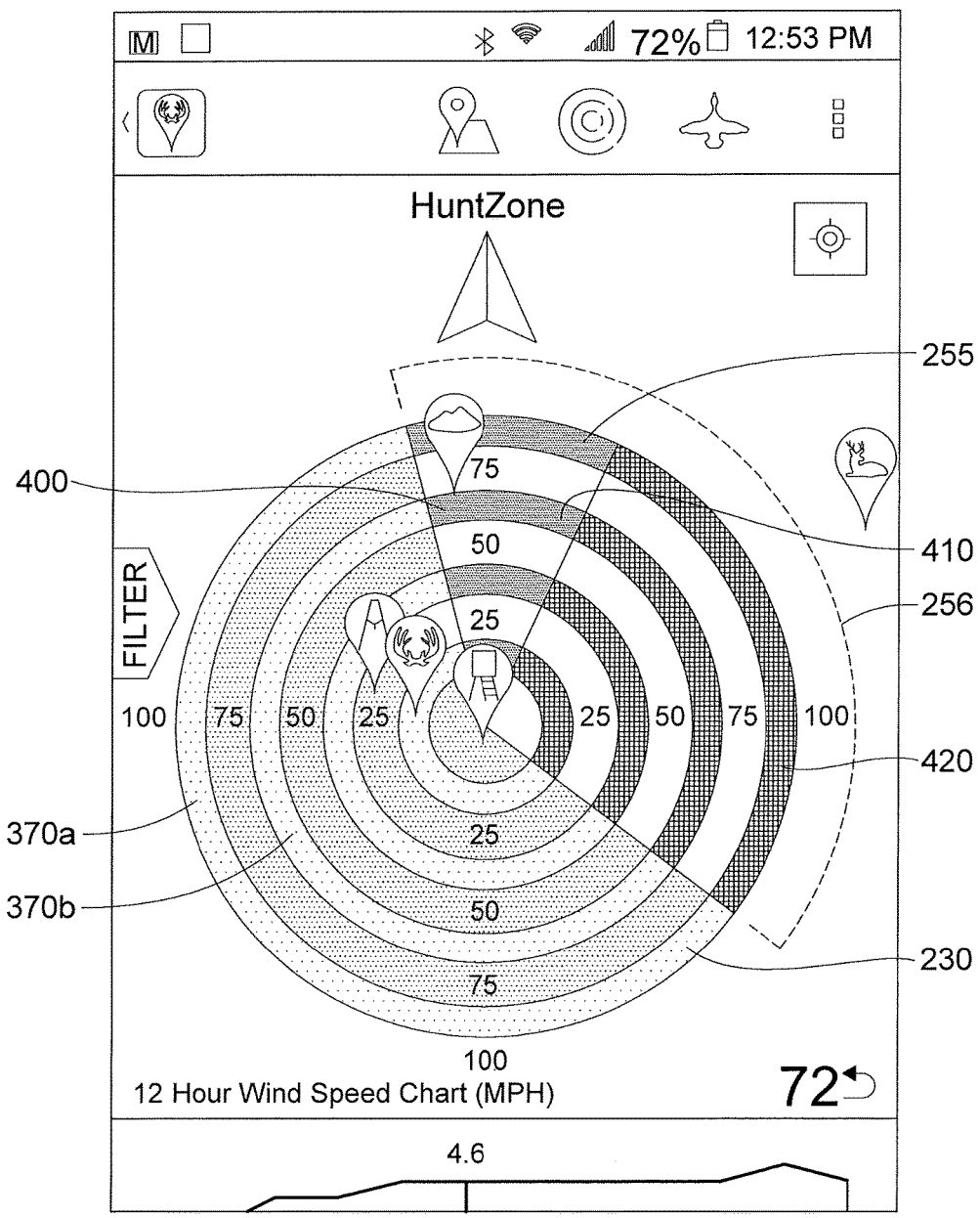
FIG. 6 shows an alternative embodiment of the circular wind direction depiction of the system and method disclosed herein.

FIG. 6 illustrates another embodiment of the invention. In this form, the circular wind direction depiction 230 has been altered so that it consists of a series of concentric circles 370a, 370b, etc. or a series of circles. Each circle may have a unit of measurement associated with it, some of the circles 370a, 370b can have a unit of measurement associated with them, or no units of measurements may be used. These measurements allow the concentric circles 370a, 370b to serve effectively as a distance measurement tool. Furthermore, in this embodiment, the circular wind direction depiction 230 will be controlled in a similar manner described above in FIGS. 4 and 5. However, in this embodiment, the instantaneous wind direction indicator 255 will be made of shaded portions of the concentric circles' radii 400. The section representing the composite wind direction 256 will also be made up of shaded portions of the concentric circles' radii 400.

In another embodiment, the user may alter the size of the radius 400 of the circular wind direction depiction 230 so that the distance between the concentric circles 370a, 370b will increase or decrease. Thus, the user may be able to select the size of the radius 400 from a menu, or pick one of a set of pre-populated options. In a different embodiment, the size of the radius 400 may be dependent on the strength of the wind direction 32a, for example, if a 30 mph wind is present, the radius 400 of the circle may be larger than if a 15 mph wind is present. In some circumstances, a hunter's scent may be detectable by game at farther distances if the wind is blowing hard.

In another embodiment, the user may alter the size of the radius of the circular wind direction depiction 230 so that the distance between the concentric circles 370a, 370b will increase or decrease. The units of measurement associated with each concentric circle 370a, 370b may increase or decrease according to the selected radius of the HuntZone.

As shown in FIG. 6, the red portions 410 of the radii 400 of the circles 370a, 370b depict the wind direction 32a at a particular selected time, and the yellow portions 420 of the radii 400 of the circles 370a, 370b represent the composite wind direction 256 (with the red color overriding the yellow), and green representing the area where a hunter's scent is unlikely to be detected over the selected time period.

As shown at the bottom of FIG. 4, the wind speed 32b over the next 72 hours can be shown in a line graph at the bottom of the screen. A user can then select a particular twelve (12) hour timeframe (or other time period). Once selected, a user can slide the time bar 340 over various times. In one embodiment, the wind direction 32 at a particular user selected time will be represented by the red portions 410 of the radii 400 of the circles 370a, 370b rather than the red or orange wedge shown in FIGS. 4 and 5. Additionally, the yellow portions 420 of the radii 400 of the circles 370a, 370b may represent everywhere the wind has blown from the beginning of the selected twelve (12) hour time period (or some other user-definable or user-selected time period) until the particular user selected time. Again, it should be recognized that the system may be configured such that the color of the instantaneous wind direction indicator 255 overrides the color denoting the composite wind direction 256.

Figure 7:
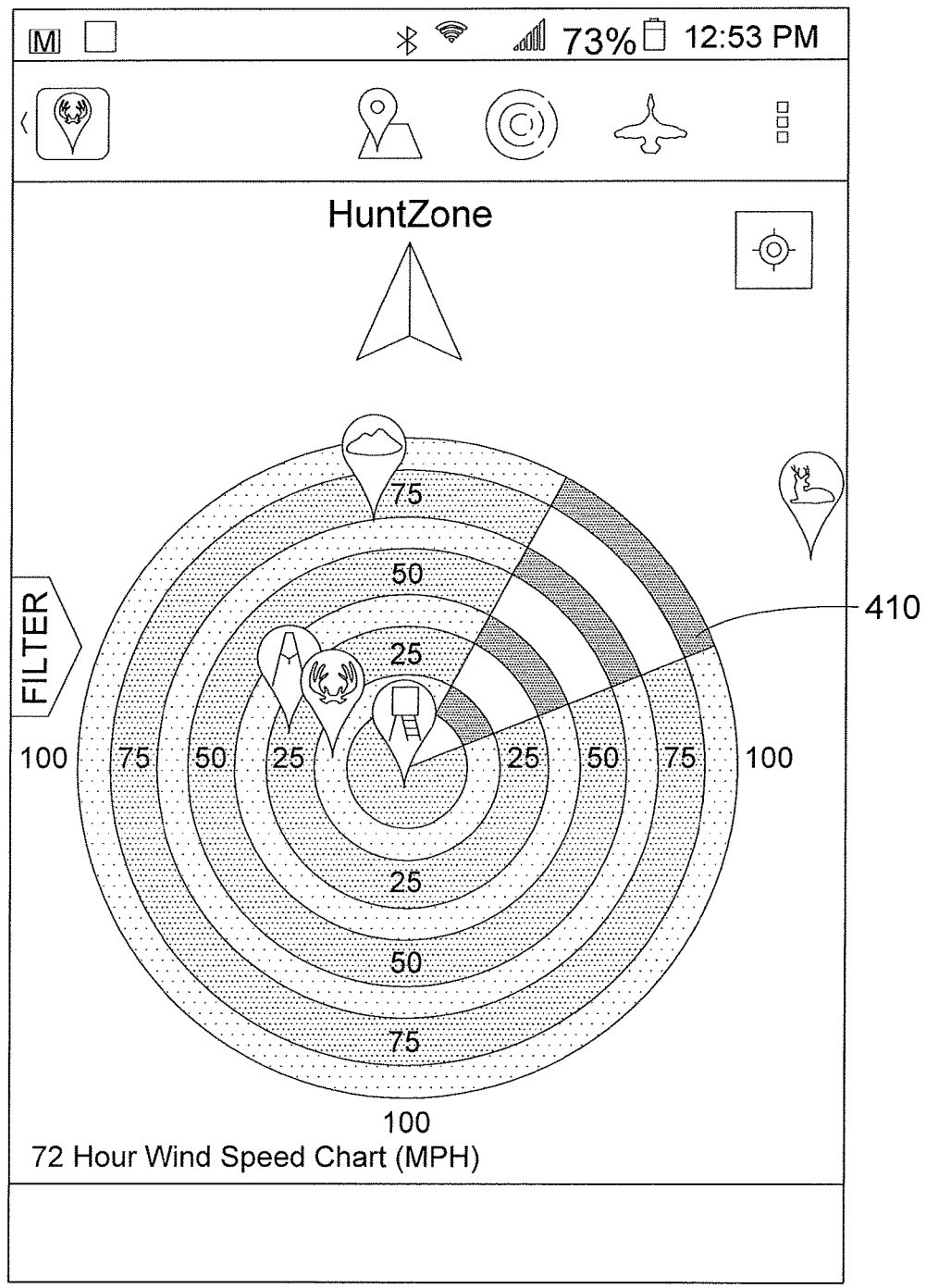
FIG. 7 shows an additional view of the circular wind direction depiction of FIG. 6 at the beginning of a user-selected time window.

As examples of generating a composite wind direction and a graphical depiction thereof, a user could select a twelve (12) hour time period from 6 am until 6 pm. As the time bar 310 sits at 6 am (not shown in FIG. 7), there will only be red portions 410 of the radii 400 of the circles 370a, 370b as shown in FIG. 7. Thus, if the wind was blowing from the west to the east, the red portions 410 of the radii 400 of the circles 370a, 370b would be generally located at the 3 o'clock position (the east position). If by 9 am the wind shifted to blowing from the north to the south, and the user slides the time bar 310 to the 9 am time slot, the red portions 410 of the radii 400 of the circle 370a, 370b would generally be located at the 6 o'clock position (the south position). There would also be yellow radii 420 at the 3 o'clock position representing where the wind has blown during the time from the beginning of the selected time period (6 am in this example), until the selected time (9 am in this example).

Figure 8:
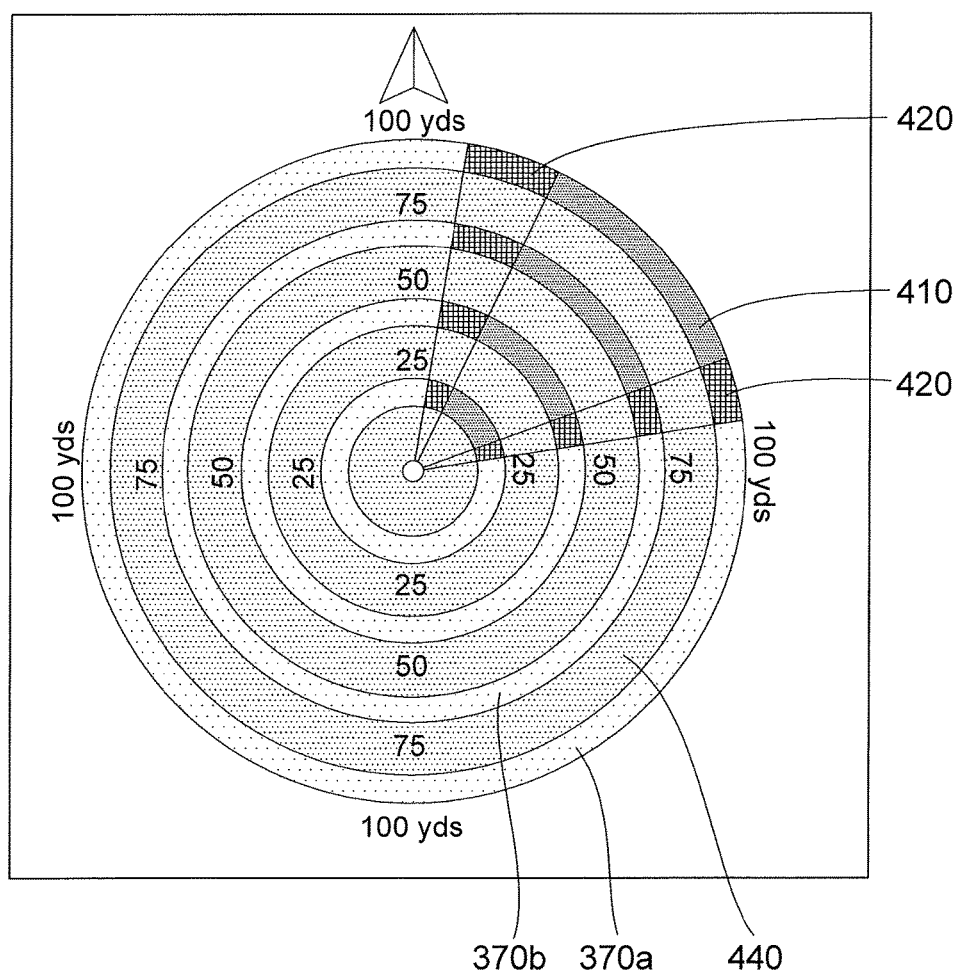
FIG. 8 shows an alternative embodiment of the circular wind direction depiction with the space between the co-centric circles shaded as disclosed by the system and method disclosed herein.

FIG. 8 shows another example of a wind direction display, similar to FIGS. 6 and 7. In this example, the red portions 410 of the radii 400 of the circle 370a, 370b would again represent the current wind direction (blowing from southwest to northeast), and the yellow portions 420 of the radii 400 of the circles 370a, 370b would represent the other areas where the wind has blown over some selected time period. Thus, in this exemplary depiction, the wind has shifted a bit over the time period. As shown in this example, the region between the co-centric circles 370a, 370b may also be shaded. In this example, the areas between the green portions 440 of the radius 400 is slightly shaded green, and the areas between the red 410 and yellow radii 420 are shaded. Additional shading can obviously be added or removed between the radii.

Figure 9:
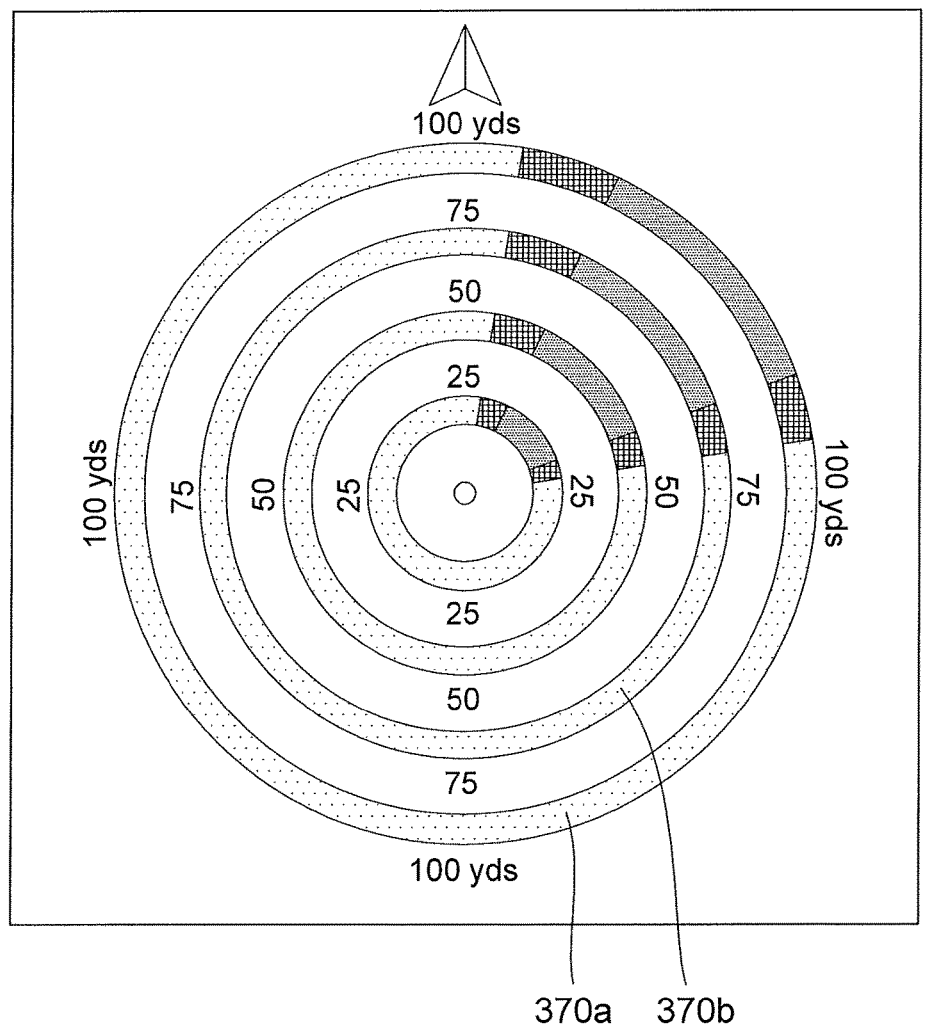
FIG. 9 shows an alternative embodiment of the circular wind direction depiction without the space between the co-centric circles shaded as disclosed by the system and method disclosed herein.

FIG. 9 shows an alternative embodiment of the wind speed 32 display with the space between the co-centric circles 370a, 370b not filled in (or shaded). The width of the actual radii 400 of the circles 370a, 370b depicted can vary. The width of the radii of the circles in FIG. 9 are much smaller than the radii of the circles shows in FIGS. 6-7.

Figure 10:
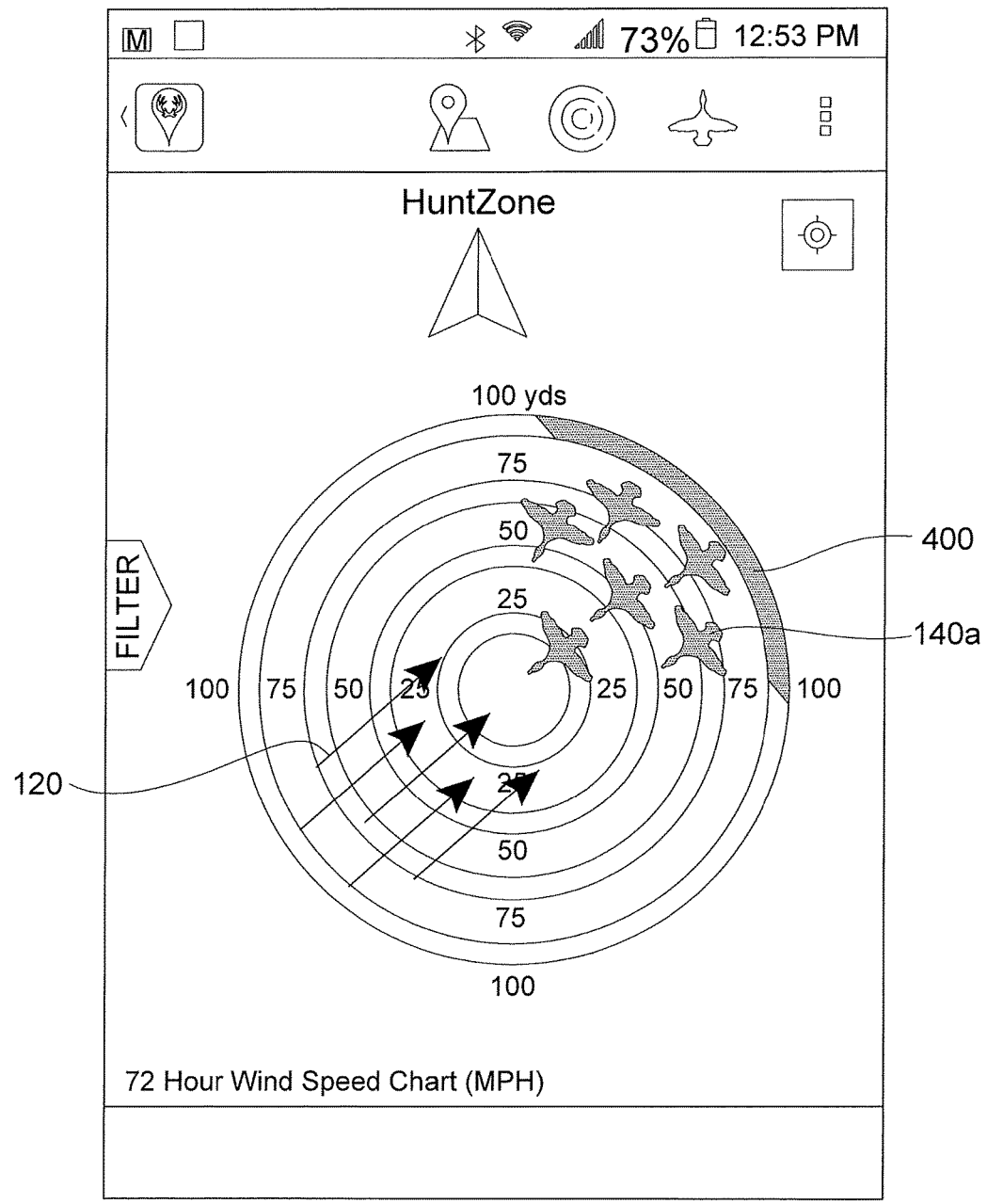
FIG. 10 shows an alternative embodiment of the wind speed and direction display using arrows and highlighted circle radius as disclosed by the system and method disclosed herein.

FIG. 10 shows an alternative embodiment of the wind speed 32b and direction 32a display using arrows 120 and highlighted circle radius 400. As shown in this alternative embodiment, the wind 32 can be displayed using arrows 120. The arrows 120 can be utilized alone or together with the highlighted circle radii 400 as shown in FIG. 10, or in the same configuration shown in FIGS. 4-9. In this example, only the outer circle radii 400 is highlighted red (showing the current wind direction 32a at a particular time). The other circle radii 400 (if additional radii are desired) can also be highlighted red. Additionally, the various colors used to represent current direction (red in this example), and the wind direction over some period of time (yellow in the prior examples) can also be used. As shown in FIG. 10, icons 140 representing particular game may also be added. For example, waterfowl 140a are generally known to like to land "into the wind", and with a southwest-to-northeast wind represented in FIG. 10, the waterfowl icons 140a represent the direction that waterfowl are most likely to approach the particular location. This depiction can also use the distance measurements as also shown in FIGS. 6-9.

While one particularly beneficial use of the method and system 10 described herein is for hunting, the ability to download and visually display wind information 32 can be used for other applications. For example, the method and system 10 would be helpful to graphically depict wind speed 32b and direction 32a over time for sailing. Thus, another potential use could indicate the best direction in which to orient a sail boat.

Another potential use of the method and system 10 could indicate the best time and location to go surfing. It is understood by those of skill in the art that certain wind speeds 32b and directions 32a can greatly impact the type of waves and surf conditions at a particular location. The invention may also include alerts, notifications, or triggers to alert a user of particular wind conditions. For example, if a particular wind condition is selected by the user as favorable (or unfavorable) for surfing (or sailing, or hunting, or other applications), the system can send a notification via text or other alert to notify the user of the condition. For example, the user may want a northwest wind at 5-10 mph to hunt a particular stand. Thus, the system can be programmed to notify the hunter of such expected or existing conditions based on the weather data.

Another potential use of the method and system 10 could indicate in which direction and how fast a boat on the water may drift. In search and rescue operations or fishing, as examples, it would be helpful to understand where a boat, persons, or objects might drift. The wind and wind direction can obviously impact the drift. Thus, a user could look at the historical wind data, and depict the potential direction, speed, and location of drifting objects.

Another potential use of the method and system 10 application could be used by emergency services, or government personnel to indicate dispersal patterns of air-born particles such as radiation, biological or chemical particles, all of which are affected by wind direction and speed.

Another potential use of the method and system 10 could indicate the best time and orientation to take off or land a plane for aviation purposes.

Another potential use of the method and system 10 could indicate the direction and reach of pollutants from a factory or industrial facility.

Another potential use of the method and system 10 could indicate the direction of smoke from some form of combustion.

Another potential use of the method and system 10 could indicate the direction of a smell coming from a restaurant or industrial entity.

Another potential use of the method and system 10 could indicate the dispersal of pollen for agricultural operations.

Another potential use of the method and system 10 could indicate the extent and direction a skyscraper may sway in a strong wind.

Another potential use of the method and system 10 could help predict aerial debris flows caused by high winds.

Another potential use of the method and system 10 could aid long range shooters in selecting a location from which to fire and in determining the effect on wind on the trajectory of the bullet.

Another potential use of the method and system 10 could indicate the way in which a ball will travel after it is kicked or hit as part of a sporting activity.

Another potential use of the method and system 10 could indicate the correct time and location to plan flights for a quad copter (or other aerial vehicle).

Although particular embodiments of the present disclosure have been described, it is not intended that such references be construed as limitations upon the scope of this disclosure except as set forth in the claims.

What is claimed is:

1. A method of depicting wind information over time, the method comprising:
   (a) receiving wind information at a handheld device from a weather information source, said wind information comprising wind speed and wind direction over a first period of time, and said handheld device having a memory, display and a processor, wherein said memory is capable of storing said wind information and satellite imagery geographical information, wherein said display is capable of displaying color images overlaying said satellite imagery geographical information, and wherein said processor is capable of generating a high level future wind speed chart and a circular wind direction depiction;
   (b) storing said wind information in the memory of the handheld device;
   (c) processing the stored wind information to display the wind information on the handheld device display in a dual display configuration comprising said high level future wind speed chart and said circular wind direction depiction, wherein the high level future wind speed chart is a line graph showing expected wind speeds over a second period of time that includes times in the future and that includes a second period start time and a second period ending time and wherein the circular wind direction depiction comprises creating a composite wind direction for a third period of time from the second period start time to a selected future time within the second period of time, and displaying the composite wind direction and an instantaneous wind direction at the selected future time, said display comprised of a first arched section oriented to indicate the instantaneous wind direction and a second arched section, said second arched section oriented to indicate the composite wind direction for the third period of time from the second period start time to a selected future time but excluding the instantaneous wind direction at the selected future time, and wherein the first arched section is at least partially colored by a first color and the second arched section is at least partially colored by a second color, and wherein said first and second colors are different.

2. The method of claim 1 wherein the circular wind direction depiction is a circle.

3. The method of claim 2 wherein the circular wind direction depiction is a series of circles.

4. The method of claim 3 wherein the center of the circular wind direction depiction is definable by a user.

5. The method of claim 1 wherein the first arched section is in the form of a wedge.

6. The method of claim 5 wherein the method also comprises adding user selected icons to the circular wind direction depiction, wherein the location of each icon is selectable by a user.

7. The method of claim 1 further comprising the step of selecting the third period of time as a subset time period of the second period of time shown displayed by the high level future wind speed chart, wherein the high level future wind speed chart has a slide bar corresponding to the selected subset time period, whereby as a user scrolls the slide bar through the selected subset time period, the first arched section of the circular wind direction depiction changes orientation to display the instantaneous wind direction at the selected future time within the selected subset time period.

8. The method of claim 7 wherein the circular wind direction depiction comprises a third arched section in a third contrasting color, said third arched section oriented so as to indicate where the wind direction is excluded during the third period of time.

9. The method of claim 8 wherein the circular wind direction depiction is a circle and includes at least one distance measurement from the center of the wind direction depiction.

10. A system for displaying wind direction and speed over time, wherein the system comprises:
    (a) a handheld device comprising a processor, a memory and a display, wherein the memory is a non-transitory transitory storage media capable of storing wind information and geographical information and containing software or firmware encoded thereon for operation by the processor, wherein said display is capable of displaying color images overlaying said geographical information, and wherein said processor is capable of generating a high level future wind speed chart and a circular wind direction depiction and said processor being programmed to perform the steps of:
        (i) receiving said wind information at the handheld device from a weather information source, said wind information comprising wind speed and wind direction over a first period of time that includes a current time and a future period of time period;
        (ii) storing said wind information in the memory of the handheld device;
        (iii) processing the stored wind information to display the wind information on the handheld display in a dual display configuration comprising said high level future wind speed chart and said circular wind direction depiction, wherein the high level future wind speed chart is a line graph showing expected wind speeds over a second period of time that includes times in the future and that includes a second period start time and a second period ending time and wherein the circular wind direction depiction is overlaid on said geographic information, the circular wind direction depiction comprises a first arched section of the circular wind direction depiction, a second arched section of the circular wind direction depiction, and a third arched section of the circular wind direction depiction, wherein the first arched section is at least partially colored by a first color, the second arched section is at least partially colored by a second color, and the third arched section is at least partially colored by a third color, wherein the first color, the second color, and the third color contrast, and wherein the first arched section is oriented in the circular wind direction depiction so as to indicate an instantaneous wind direction at a selected future time within the second period of time, the second arched section is oriented so as to indicate a composite wind direction for a third time period from the second period start time to the selected future time but excluding the first arched section indicative of instantaneous wind direction at the selected future time, and the third arched section is oriented so as to indicate where the wind direction is excluded during the third period of time.

11. The system of claim 10 wherein the processor is further programmed to display the circular wind direction depiction as a circle.

12. The system of claim 11 wherein the processor is further programmed to display the circular wind direction depiction as a series of circles.

13. The system of claim 10 wherein the first arched section represents the instantaneous wind direction such that the selected future time is at any future point in time within the second period of time.

14. The system of claim 13 wherein the radius of circular wind direction depiction varies depending on the wind speed.

15. The system of claim 14 wherein the processor is further programmed to allow a user to add user selected icons to the circular wind direction depiction, wherein the location of each icon is selected by the user.

16. The system of claim 13 wherein the processor is further programmed to receive a selection of the third time period as a subset time period of the second period of time shown displayed by the high level future wind speed chart, wherein the high level future wind speed chart has a slide bar corresponding to the selected subset time period, whereby as a user scrolls the slide bar through the selected subset time period, the first arched section of the circular wind direction depiction changes orientation to display the instantaneous wind direction at the selected future time within the selected subset time period.

17. The system of claim 16 wherein the circular wind direction depiction is a circle and includes at least one distance measurement from the center of the wind direction depiction.

18. A method of graphically displaying wind information over time comprising:
(a) receiving weather information comprising wind information from a weather information source, wherein said wind information comprises wind speed and wind direction;
(b) displaying the wind speed and wind direction over a user selected geographic region on a handheld device display, wherein said display is capable of displaying color images overlaying said geographical region, and wherein the wind speed and wind direction are represented on the display by one or more concentric circles; and
(c) displaying the changes in the wind speed and direction over the user selected geographic region over a time period that includes times in the future, wherein the changes in the future wind speed and direction are depicted as a high level future wind speed chart and a circular wind direction depiction on the display changing the appearance of one of more of the concentric circles, a first arched section of the one or more concentric circles, a second arched section of the one or more concentric circles, and a third arched section of the one or more concentric circles, wherein the first arched section of the one or more concentric circles is colored by a first color, the second arched section of the one or more concentric circles is colored by a second color, and the third arched section of the one or more concentric circles is colored by a third color, wherein the first color, the second color, and the third color contrast, and wherein the first arched section is oriented so as to indicate an instantaneous wind direction at a selected future time in the time period, the second arched section is oriented so as to indicate a composite wind direction from a start time of the time period to the selected future time but excluding the first arched section indicative of instantaneous wind direction at the selected future time, and the third arched section is oriented so as to indicate where the wind direction is excluded during the time period.

19. The method of claim 18 further comprising the step of selecting a subset time period from the start time of the time period to the selected future time shown displayed by the high level future wind speed chart, wherein the high level future wind speed chart has a slide bar corresponding to the subset time period, whereby as a user scrolls the slide bar through the selected subset time period, the first arched section of the circular wind direction depiction changes orientation to display the wind direction at the selected future time within the selected subset time period.

20. A method of displaying wind information over time comprising:
(a) providing a user interface for a handheld device having a memory, display and a processor, wherein said memory is capable of storing said wind information, wherein said display is capable of displaying color images, and wherein said processor is capable of generating a high level future circular wind direction depiction, said user interface having (i) a user-designated location at the center of said circular wind direction depiction and (ii) a time segment display having user-selectable times associated with a time period that includes times in the future;
(b) processing stored wind information associated with the user-designated location and time period; and
(c) displaying the wind information in the user interface as a first pie shape within the circular wind direction depiction, said first pie shape having a vertex at the user-designated location, and said first pie shape representative of an instantaneous wind direction at a selected future time within the time segment display, wherein the first pie shape within the circular wind direction depiction changes to reflect changes in wind direction at different selected times with the time period, the circular wind direction depiction further comprising a second pie shape oriented so as to indicate a composite wind direction from a start time of the time period to the selected future time but excluding the first pie shape representative of the instantaneous wind direction at the selected future time and further comprising a third pie shape oriented so as to indicate where the wind direction is excluded from the start time of the time period to the selected future time.

21. The method of claim 20, wherein the time segment display has an associated slide bar for selecting the selected future time within the time period.

22. The method of claim 20, further comprising displaying wind speed associated with the user-designated location and the selected future time.

* * * * *